(12) United States Patent
Kawamitsu

(10) Patent No.: US 12,217,773 B2
(45) Date of Patent: Feb. 4, 2025

(54) DISK DEVICE

(71) Applicants: Kabushiki Kaisha Toshiba, Tokyo (JP); Toshiba Electronic Devices & Storage Corporation, Tokyo (JP)

(72) Inventor: Yuki Kawamitsu, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/244,671

(22) Filed: Sep. 11, 2023

(65) Prior Publication Data

US 2024/0321322 A1  Sep. 26, 2024

(30) Foreign Application Priority Data

Mar. 24, 2023  (JP) .................................. 2023-048278

(51) Int. Cl.
*G11B 33/12*  (2006.01)
*G11B 19/20*  (2006.01)

(52) U.S. Cl.
CPC ........ *G11B 33/128* (2013.01); *G11B 19/2009* (2013.01); *G11B 33/126* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| RE35,915 E | * | 10/1998 | Hastings ............... G11B 33/128 |
| | | | 361/740 |
| 5,880,904 A | * | 3/1999 | Mizoshita ............... G11B 21/12 |
| 6,388,873 B1 | * | 5/2002 | Brooks ................ G11B 33/121 |
| 7,108,543 B2 | | 9/2006 | Higashide |
| 8,116,075 B2 | | 2/2012 | Hall et al. |
| 2017/0374766 A1 | * | 12/2017 | Zebian ................. G11B 33/128 |
| 2019/0304511 A1 | * | 10/2019 | Hisakuni .............. H05K 5/0247 |

FOREIGN PATENT DOCUMENTS

JP      H04-319592 A      11/1992

* cited by examiner

*Primary Examiner* — Peter Vincent Agustin
(74) *Attorney, Agent, or Firm* — Maier & Maier, PLLC

(57) ABSTRACT

A disk device according to one embodiment includes magnetic disks, a spindle motor, a housing, a first board, and a first connector. The magnetic disks are arranged in an axial direction. The spindle motor rotates the magnetic disks about a first rotation axis. The magnetic disks and the spindle motor are accommodated in an inner space in the housing. The housing includes a first wall having the spindle motor attached thereto, and a second wall protruding from the first wall to surround the inner space. The first board is attached to an outer surface of the second wall. The first connector is attached to the first board and is connected to an external device. Each of the magnetic disks has a diameter of 80 mm or more and 100 mm or less. The housing has a maximum dimension of 26.2 mm or more in the axial direction.

14 Claims, 7 Drawing Sheets

DISK DEVICE

CROSS-REFERENCE TO RELATED APPLICATIONS

This application is based upon and claims the benefit of priority from Japanese Patent Application No. 2023-048278, filed on Mar. 24, 2023, the entire contents of which are incorporated herein by reference.

FIELD

Embodiments described herein relate generally to a disk device.

BACKGROUND

A disk device such as a hard disk drive typically incorporates a plurality of magnetic disks, a spindle motor (SPM), and a head stack assembly (HSA) in a housing. The disk device further includes a board such as a printed circuit board (PCB) mounted on the bottom surface of the housing.

Along with improvement in performance of the disk device, the board mountable area on the bottom surface of the housing may decrease, or a larger number of or a larger-size electronic components may be mounted on the board. In such a case, for example, there may be a limitation on the arrangement of the electronic components on the board and/or the number of magnetic disks.

DETAILED DESCRIPTION

In general, according to one embodiment, a disk device includes a plurality of magnetic disks, a spindle motor, a housing, a first board, and a first connector. The plurality of magnetic disks are arranged in an axial direction along a first rotation axis. The spindle motor is configured to rotate the plurality of magnetic disks about the first rotation axis. The plurality of magnetic disks and the spindle motor are accommodated in an inner space in the housing. The housing includes a first wall having the spindle motor attached thereto, and a second wall protruding from the first wall to surround the inner space. The first board is attached to an outer surface of the second wall. The outer surface faces an outside of the inner space. The first connector is attached to the first board and configured to be connected to an external device. Each of the plurality of magnetic disks has a diameter of 80 mm or more and 100 mm or less. The housing has a maximum dimension of 26.2 mm or more in the axial direction.

First Embodiment

Hereinafter, a first embodiment will be described with reference to FIGS. 1 to 5. In the present specification, components according to embodiments and descriptions of the components may be described in a plurality of expressions. The components and the descriptions thereof are examples, and are not limited by the expressions of the present specification. The components may be identified by names different from the names in the present specification. The components may be described by expressions different from the expressions in the present specification.

Figure 1:
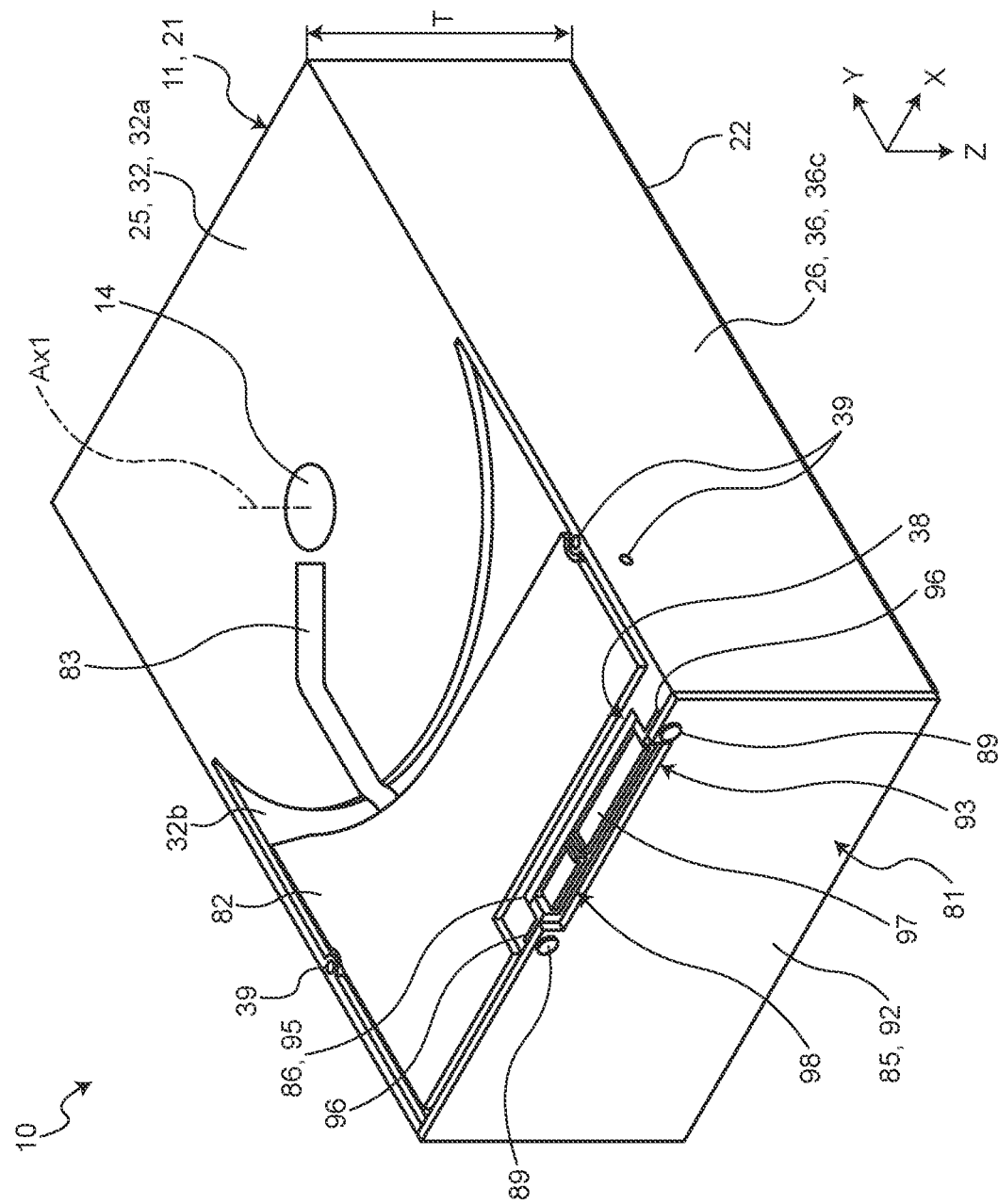
FIG. 1 is an exemplary perspective view illustrating an HDD according to a first embodiment.

FIG. 1 is an exemplary perspective view illustrating a hard disk drive (HDD) 10 according to the first embodiment. The HDD 10 is an example of a disk device and may also be referred to as an electronic device, a storage device, an external storage device, or a magnetic disk device.

As illustrated in each drawing, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Further, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

Figure 2:
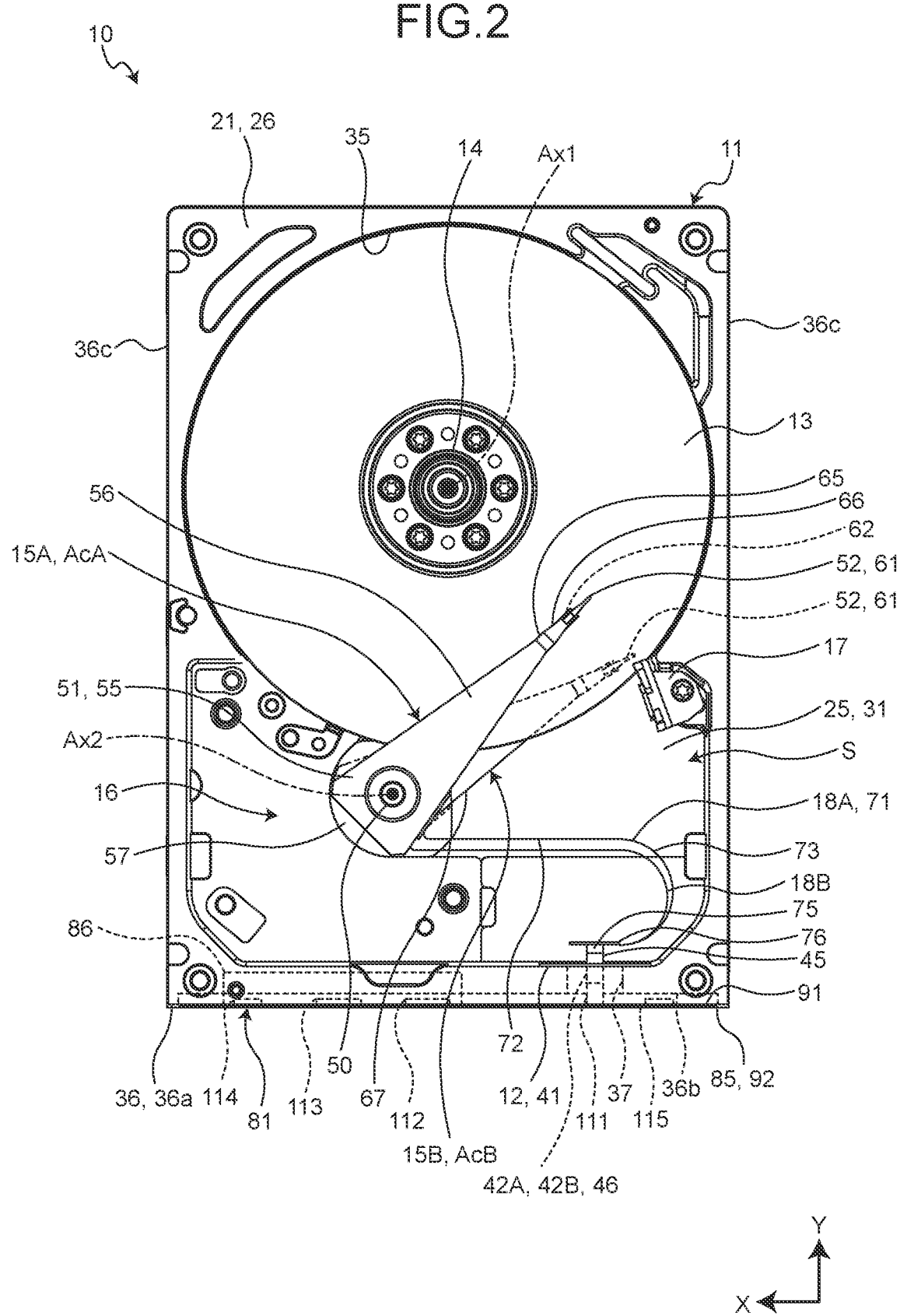
FIG. 2 is an exemplary plan view illustrating the HDD of the first embodiment.

FIG. 2 is an exemplary plan view illustrating the HDD 10 of the first embodiment. As illustrated in FIG. 2, the HDD 10 includes a housing 11, a relay board 12, a plurality of magnetic disks 13, a spindle motor (SPM) 14, two head stack assemblies (HSA) 15A and 15B, a voice coil motor (VCM) 16, a ramp load mechanism 17, and two flexible printed circuit board (FPC) 18A and 18B.

The magnetic disk 13 may also be referred to as a platter or a medium. The FPC 18A is an example of a first flexible printed circuit board and a flexible printed circuit board. The FPC 18B is an example of a second flexible printed circuit board.

Figure 3:
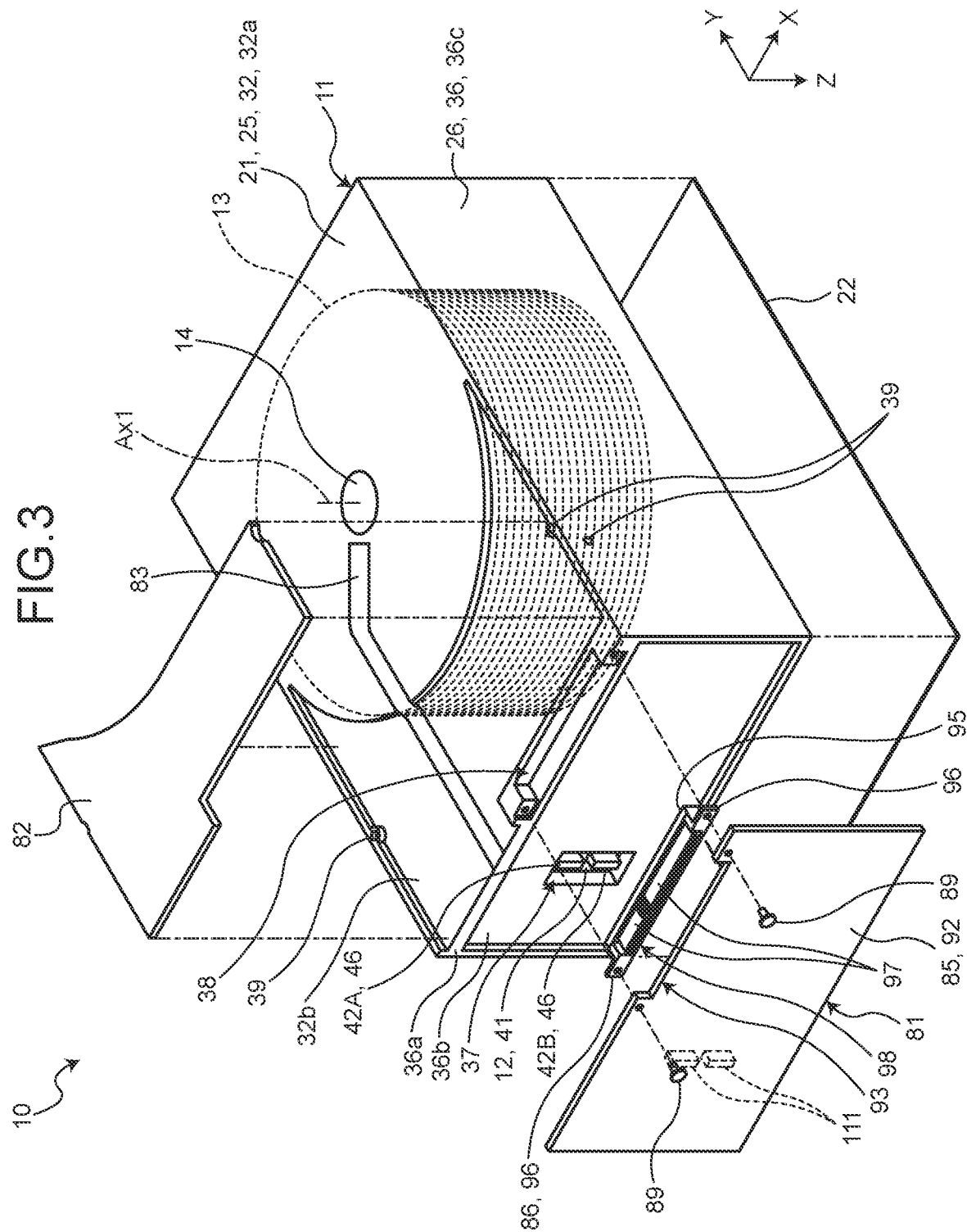
FIG. 3 is an exemplary perspective view illustrating the HDD of the first embodiment in an exploded manner.

FIG. 3 is an exemplary perspective view illustrating the HDD 10 of the first embodiment in an exploded manner. As illustrated in FIG. 3, the housing 11 includes a base 21 and a cover 22. The housing 11 is not limited to this example. FIG. 2 illustrates the housing 11 with the cover 22 being omitted for the sake of explanation.

Each of the base 21 and the cover 22 is made of a metal material such as an aluminum alloy. The materials of the base 21 and the cover 22 may be other materials or may be different from each other.

As illustrated in FIG. 2, the base 21 with an inner chamber S has a substantially rectangular parallelepiped box shape. The inner chamber S is an example of an inner space. The inner chamber S is open to the outside of the base 21 in the +Z direction. The magnetic disk 13, the SPM 14, the HSA 15A and 15B, the VCM 16, the ramp load mechanism 17, and the FPC 18A and 18B are accommodated in the inner chamber S. The base 21 includes a bottom wall 25 and a side wall 26. The bottom wall 25 is an example of the first wall. The side wall 26 is an example of the second wall.

The bottom wall 25 has a substantially rectangular (quadrangular) plate shape extending along an X-Y plane. The bottom wall 25 includes an inner surface 31 illustrated in FIG. 2 and an outer surface 32 illustrated in FIG. 3. The inner surface 31 faces substantially in the +Z direction as a whole. The inner surface 31 faces the inner chamber S. The outer surface 32 is opposite the inner surface 31 and faces substantially in the −Z direction as a whole. The outer surface 32 faces the outside of the inner chamber S.

As illustrated in FIG. 3, the outer surface 32 includes a bottom surface 32a and a recessed surface 32b. The bottom surface 32a is provided at an end of the base 21 in the −Z direction. The recessed surface 32b is recessed substantially in the +Z direction from the bottom surface 32a. In other words, the recessed surface 32b is recessed from the bottom surface 32a toward the inner chamber S.

The side wall 26 protrudes substantially in the +Z direction from the edge of the bottom wall 25 and has a substantially rectangular frame shape surrounding the inner chamber S. The bottom wall 25 and the side wall 26 are integrated. As illustrated in FIG. 2, the side wall 26 includes an inner surface 35 and an outer surface 36.

The inner surface 31 of the bottom wall 25 and the inner surface 35 of the side wall 26 form (define, section) the inner chamber S. That is, the inner surface 35 faces the inner chamber S. The outer surface 36 is opposite the inner surface 35. The outer surface 36 faces the outside of the inner chamber S.

The outer surface 36 includes an end surface 36a and a recessed surface 36b. The end surface 36a is provided at an end of the base 21 in the −Y direction. The recessed surface 36b is recessed substantially in the +Y direction from the end surface 36a. In other words, the recessed surface 36b is recessed from the end surface 36a toward the inner chamber S.

The outer surface 36 further includes two side surfaces 36c. The two side surfaces 36c extend substantially in the +Y direction from both ends of the end surface 36a in the X direction. The two side surfaces 36c are substantially flat and face in the X direction.

As illustrated in FIG. 3, the base 21 is provided with a through hole 37, a recess 38, and a plurality of screw holes 39. The through hole 37 is an example of a through hole, a first through hole, and a second through hole. The through hole 37 penetrates the side wall 26 and is open to the recessed surface 36b and the inner surface 35. That is, the through hole 37 communicates with the inner chamber S.

The recess 38 is a cutout opening on the outer surface 32 of the bottom wall 25 and the outer surface 36 of the side wall 26. The recess 38 may be open only to the outer surface 36 of the side wall 26. The recess 38 is spaced from the inner chamber S in no communication with the inner chamber S.

The plurality of screw holes 39 are provided in the bottom surface 32a of the bottom wall 25 and the side surface 36c of the side wall 26. For example, the HDD 10 is fixed to a case of an external device such as a host computer or a drive bay by screws inserted into the screw holes 39.

The cover 22 is attached to an end of the side wall 26 in the +Z direction by welding, for example. The cover 22 hermetically closes the inner chamber S. The cover 22 may cover another cover attached to the side wall 26 with, for example, a screw.

The inner chamber S is filled with a gas different from air. For example, the inner chamber S is filled with a low density gas having a density lower than that of air, an inert gas having low reactivity, or the like. In the present embodiment, the inner chamber S is filled with helium. The inner chamber S may be filled with another fluid.

The relay board 12 includes a printed circuit board (PCB) 41 and two connectors 42A and 42B. The connector 42A is an example of a second connector and a fourth connector. The connector 42B is an example of a third connector.

The PCB 41 is, for example, attached to the inner surface 35 of the side wall 26 to hermetically close the through hole 37. For example, a gap between the PCB 41 and the inner surface 35 is sealed with solder, a gasket, or an adhesive.

The two connectors 42A and 42B are juxtaposed to each other substantially in the Z direction. In other words, the two connectors 42A and 42B are aligned substantially in the Z direction. As illustrated in FIG. 2, each of the two connectors 42A and 42B includes an inner connector 45 and an outer connector 46.

The inner connector 45 and the outer connector 46 are mounted on the PCB 41. The inner connector 45 protrudes from the PCB 41 toward the inner chamber S and is positioned in the inner chamber S. The two outer connectors 46 protrude from the PCB 41 toward the outside of the inner chamber S and are positioned in the through hole 37. The inner connector 45 is electrically connected to the outer connector 46.

The plurality of magnetic disks 13 are situated substantially orthogonal to the Z direction. Each of the magnetic disks 13 includes magnetic recording layers on the upper surface and the lower surface. The plurality of magnetic disks 13 are arranged at intervals in the Z direction.

The HDD 10 of the present embodiment is a 3.5-inch HDD. The diameter of each of the plurality of magnetic disks 13 is set to, for example, 80 mm or more and 100 mm or less. Specifically, the diameter of the magnetic disk 13 is set to about 96 mm. The thickness of the magnetic disk 13 is set to about 0.635 mm. The dimensions of the magnetic disk 13 are not limited to this example.

The HDD 10 of the present embodiment includes 20 magnetic disks 13. The number of magnetic disks 13 is not limited to this example. The housing 11 has a large Z-directional dimension sufficient to accommodate a large number of magnetic disks 13.

For example, a maximum dimension (thickness) T of the housing 11 in the Z direction illustrated in FIG. 1 is set to 26.2 mm or more. 3.5-inch hard disk drive form factor SFF-8300 designed by the Small Form Factor Committee defines a plurality of maximum dimensions (hereinafter, referred to as specified dimensions) for the Z-directional dimension of an HDD. One of the specified dimensions defined in SFF-8300 is 26.10 mm. That is, the maximum thickness T of the housing 11 in the present embodiment is larger than the specified dimension.

The maximum thickness T of the housing 11 of the present embodiment is set to more than 42 mm and 54 mm or less, for example. Specifically, the maximum thickness T of the housing 11 of the present embodiment is set to about 53.7 mm. Another of the specified dimensions defined in SFF-8300 is 42.00 mm. That is, the maximum thickness T of the housing 11 in the present embodiment is larger than the specified dimension.

The maximum dimension of the housing 11 in the X direction and the Y direction conforms to one of the specified dimensions defined in SFF-8300. For example, the maximum dimension (width) of the housing 11 in the X direction is set to 101.85 mm. The maximum dimension (length) of the housing 11 in the Y direction is set to 146.99 mm.

The SPM 14 is attached to the bottom wall 25. The SPM 14 supports the plurality of magnetic disks 13 stacked at intervals in the Z direction. The plurality of magnetic disks 13 are held by a hub of the SPM 14 with, for example, a clamp spring.

The SPM 14 rotates the plurality of magnetic disks 13 about an axis Ax1. The axis Ax1 is an example of the first rotation axis. The axis Ax1 is the center of rotation of the magnetic disk 13 and is also the axis of the hub of the SPM 14.

In the present specification, an axial direction, a radial direction, and a circumferential direction are defined for convenience. The axial direction is a direction along the axis Ax1. The axis Ax1 extends in the Z direction. Thus, the axial direction coincides with the Z direction. The radial direction is a direction orthogonal to the axis Ax1. The circumferential direction is a direction around the axis Ax1.

As illustrated in FIG. 2, the two HSA 15A and 15B are aligned in the axial direction and individually supported by a support shaft 50 in a rotatable manner. The support shaft 50 is disposed at a position separated from the magnetic disk 13 in the radial direction, and extends, for example, substantially in the +Z direction from the inner surface 31 of the bottom wall 25.

The two HSA 15A and 15B can rotate about the same axis Ax2 separated from the axis Ax1. The axis Ax2 is an example of the second rotation axis. The axis Ax2 is, for example, the center of rotation of the HSA 15A and 15B, and is also the axis of the support shaft 50. The axis Ax2 is disposed substantially parallel to the axis Ax1 and extends in the Z direction.

Each of the two HSA 15A and 15B includes a carriage 51 and a plurality of head gimbal assemblies (HGA) 52. The carriage 51 includes an actuator block 55, a plurality of arms 56, and a coil holder 57. The actuator block 55, the plurality of arms 56, and the coil holder 57 are integrated together.

The actuator block 55 is rotatably supported by the support shaft 50 via a bearing, for example. The plurality of arms 56 protrude from the actuator block 55 in a direction substantially orthogonal to the axis Ax2. The plurality of arms 56 are arranged at intervals in the Z direction to enter a gap between the corresponding magnetic disks 13.

The coil holder 57 protrudes from the actuator block 55 and opposes the arm 56. The coil holder 57 holds a voice coil of the VCM 16. The VCM 16 includes the voice coil, a pair of yokes, and a magnet provided on the yokes.

Each of the plurality of HGA 52 are attached to a tip of a corresponding one of the plurality of arms 56 and protrudes from the arm 56. Each of the plurality of HGA 52 includes a suspension 61 and a magnetic head 62.

The magnetic head 62 may also be referred to as a slider. The magnetic head 62 of the HSA 15A is an example of a first magnetic head. The magnetic head 62 of the HSA 15B is an example of a second magnetic head.

The suspension 61 includes a base plate 65, a load beam 66, and a flexure 67. The base plate 65 is attached to a distal end of the arm 56. The load beam 66 is attached to a distal end of the base plate 65 and protrudes from the base plate 65 in a direction orthogonal to the axis Ax2.

The flexure 67 has an elongated band shape. The flexure 67 is, for example, a stacked plate including a metal plate (backing layer) made of stainless steel or the like, an insulating layer formed on the metal plate, a conductive layer formed on the insulating layer and constituting a plurality of wirings (wiring patterns), and a protective layer (insulating layer) covering the conductive layer.

The flexure 67 is attached to the base plate 65 and the load beam 66. The flexure 67 includes a displaceable gimbal (elastic support) at one end above the load beam 66.

The magnetic head 62 is mounted on the gimbal of the flexure 67. The magnetic head 62 records and reproduces information on and from the magnetic disks 13. In other words, the magnetic heads 62 read and write information from and to the magnetic disks 13.

At least one of the plurality of magnetic disks 13 where the magnetic head 62 of the HSA 15A reads and writes information is an example of a first magnetic disk. At least one of the plurality of magnetic disks 13 where the magnetic head 62 of the HSA 15B reads and writes information is an example of a second magnetic disk.

The carriage 51 and the suspension 61 of the HSA 15A form an actuator AcA. The carriage 51 and the suspension 61 of the HSA 15B form an actuator AcB. The actuators AcA and AcB may further include other components. The actuator AcA is an example of a first actuator. The actuator AcB is an example of a second actuator.

The flexures 67 of the actuators AcA and AcB hold the magnetic head 62. The actuators AcA and AcB are aligned in the axial direction. The actuators AcA and AcB move the magnetic head 62 by rotating about the same axis Ax2.

The VCM 16 rotates the HSA 15A and 15B about the axis Ax2 to dispose them at desired positions. When the magnetic head 62 moves to the outermost periphery of the magnetic disk 13 with the rotation of the HSA 15A and 15B with the VCM 16, the ramp load mechanism 17 holds the magnetic head 62 at a position separated from the magnetic disks 13.

Each of the two FPC 18A and 18B includes two surfaces 71 and 72 and a plurality of curved parts 73. The surfaces 71 and 72 are opposite to each other. For example, at one end of each of the FPC 18A and 18B, a connector 75 is mounted on the surface 71, and a reinforcing plate 76 is attached to the surface 72. The reinforcing plate 76 supports the connector 75 via the FPC 18A and 18B. The connector 75 is connected to one corresponding inner connector 45 of the two connectors 42A and 42B.

A plurality of pads are provided on the surface 71 at the other ends of the FPC 18A and 18B. The plurality of pads are bonded to one corresponding flexure 67 of the two HSA 15A and 15B by, for example, solder. This causes the two FPC 18A and 18B to connect the flexures 67 of the two HSA 15A and 15B and the two connectors 42A and 42B.

The curved parts 73 are arc-shaped parts of the FPC 18A and 18B. The axis of the arc of each of the plurality of curved parts 73 extends substantially in the Z direction. The surfaces 71 and 72 of the FPC 18A and 18B in the present embodiment extend substantially in the Z direction over the entire region, and do not have a portion orthogonal to the Z direction. The FPC 18A and 18B are not limited to this example, and may be curved such that the surfaces 71 and 72 are orthogonal to the Z direction.

As illustrated in FIG. 3, the HDD 10 further includes a PCB assembly (PCBA) 81, a PCB 82, and an FPC 83. The PCB 82 is an example of a second board. The PCBA 81 includes a PCB 85 and an interface (I/F) connector 86. The PCB 85 is an example of a first board. The I/F connector 86 is an example of a first connector.

The PCB 85 has a plate shape extending along the X-Z plane. The PCB 85 is attached to the outer surface 36 of the side wall 26 with screws 89, for example. As illustrated in FIG. 2, the PCB 85 includes an inner surface 91 and an outer surface 92.

The inner surface 91 is substantially flat and faces in the +Y direction. The inner surface 91 of the PCB 85 and the outer surface 36 of the side wall 26 face each other. The inner surface 91 is supported by, for example, the end surface 36*a*. The outer surface 92 is opposite the inner surface 91. The outer surface 92 is substantially flat and faces in the −Y direction. The inner surface 91 and the outer surface 92 extend along the axial direction.

As illustrated in FIG. 3, the PCB 85 is provided with an opening 93. The opening 93 penetrates the PCB 85 in the Y direction and is open to the inner surface 91 and the outer surface 92. The opening 93 is, for example, a cutout that is open to the edge of the PCB 85 in the +Z direction. The opening 93 may be a hole.

The I/F connector 86 includes a main body 95, two attachment parts 96, and a connection terminal 97. The main body 95 has a substantially rectangular parallelepiped shape extending substantially in the X direction. The main body 95 is provided with a slot 98. The slot 98 is a recess that is open in the −Y direction. The two attachment parts 96 are provided at both ends of the main body 95 in the X direction. The connection terminal 97 is provided in the slot 98 and protrudes in the −Y direction from the bottom of the slot 98.

The I/F connector 86 is a connector (port) conforming to Serial ATA (SATA) standard or Serial Attached SCSI (SAS) standard. The I/F connector 86 may be a connector conforming to both the SATA standard and the SAS standard or conforming to another standard. For example, the I/F connector 86 is connected to a data cable and a power cable at the connection terminal 97 and is connected to an external device via the data cable and the power cable.

The I/F connector 86 is attached to the PCB 85. For example, the I/F connector 86 is mounted on the inner surface 91 of the PCB 85. Thus, the I/F connector 86 protrudes substantially in the +Y direction from the inner surface 91. Further, the attachment part 96 is disposed between the side wall 26 and the PCB 85. The screws 89 are inserted into the side wall 26 through the PCB 85 and the attachment part 96. Thereby, the side wall 26, the PCB 85, and the attachment part 96 of the I/F connector 86 to be fixed to one another.

The I/F connector 86 is a right angle connector. That is, the connection terminal 97 extends in the Y direction substantially orthogonal to the inner surface 91 on which the I/F connector 86 is mounted. Thus, the data cable and the power cable are inserted into the I/F connector 86 in the +Y direction and removed from the I/F connector 86 in the −Y direction.

At least a part of the I/F connector 86 is accommodated in the recess 38. The recess 38 has, for example, a shape corresponding to the outer shape of the I/F connector 86. A part of the side wall 26 forming the recess 38 supports, for example, the attachment part 96. At least the attachment part 96 of the I/F connector 86 is located between the side wall 26 and the PCB 85.

The slot 98 of the I/F connector 86 is exposed to the outside of the HDD 10 through the opening 93 of the PCB 85. The I/F connector 86 may be partially accommodated in the opening 93 of the PCB 85.

The I/F connector 86 is positioned in line with a connector mounted on a 3.5-inch device as defined by one specification of SFF-8300. The position of the I/F connector 86 may be determined in line with a connector position on a 3.5-inch device conforming to the SATA standard. Specifically, the position of the I/F connector 86 may be determined in conformity with 6.22 Connector Locations in Serial ATA Revision 3.3 Gold.

For example, in the X direction, the distance between the connection terminal 97 and the end of the housing 11 in the +X direction is set to 13.43 mm. In the Y direction, the distance between the connection terminal 97 and the screw hole 39 provided in the bottom surface 32*a* is set to 36.38 mm. In the Z direction, the distance between the connection terminal 97 and the screw hole 39 provided in the side surface 36*c* is set to 2.85 mm. The position of the I/F connector 86 may conform to another specification defined in SFF-8300 or may conform to another Revision of Serial ATA.

The PCB 82 is attached to the outer surface 32 of the bottom wall 25 with, for example, screws. The PCB 82 is disposed, for example, on an inner side of the recessed surface 32*b*. The PCB 82 is closer to the cover 22 than the bottom surface 32*a* of the bottom wall 25 is. That is, the PCB 82 does not protrude in the −Z direction from the bottom surface 32*a* of the bottom wall 25. In the present embodiment, the PCB 82 is smaller than the PCB 85.

The FPC 83 electrically connects, for example, the PCB 85, the PCB 82, and the SPM 14. An FPC or a cable connecting the PCB 85 and the PCB 82 and an FPC or a cable connecting the PCB 82 and the SPM 14 may be separately provided.

Figure 4:
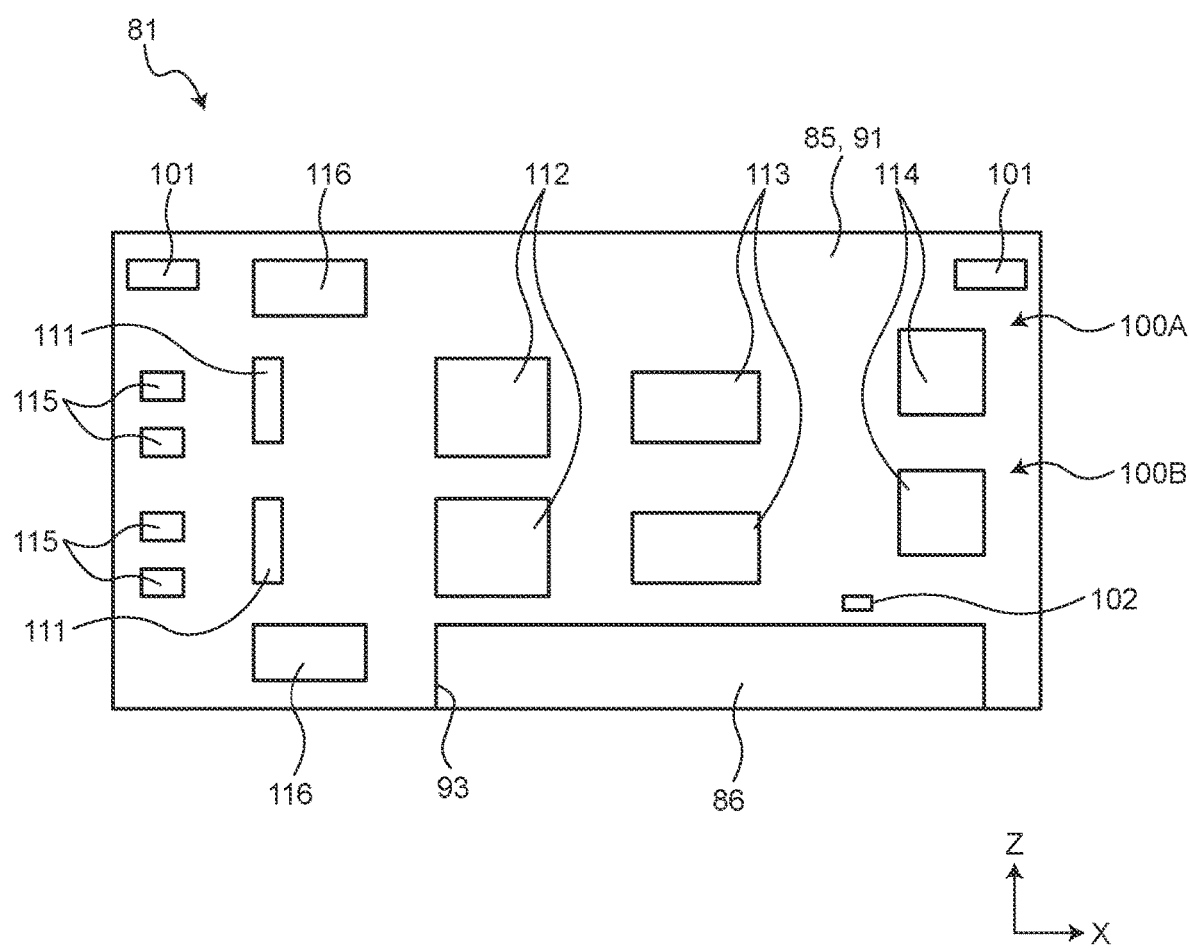
FIG. 4 is an exemplary front view illustrating a PCBA of the first embodiment.

FIG. 4 is an exemplary front view illustrating the PCBA 81 of the first embodiment. As illustrated in FIG. 4, the PCBA 81 further includes two circuits 100A and 100B, two RV sensors 101, and an electronic fuse 102.

Each of the two circuits 100A and 100B includes a read/write connector (R/W connector) 111, a system-on-a-chip (SoC) 112, a DRAM 113, a static VAR compensator (SVC) 114, a flash memory (FROM) 115, and a regulator 116. The circuits 100A and 100B are not limited to this example. The SoC 112 is an example of a controller.

The RV sensors 101, the electronic fuse 102, the R/W connector 111, the SoC 112, the DRAM 113, the SVC 114, the FROM 115, and the regulator 116 are mounted on the inner surface 91 of the PCB 85 and disposed on the inner side of the recessed surface 36*b*. Other electronic components may be further mounted on the inner surface 91 of the PCB 85. For example, a multilayer ceramic capacitor (MLCC) or a tantalum capacitor is mounted on the inner surface 91.

In the present embodiment, all the electronic components of the PCBA 81 are mounted on the inner surface 91. At least one of the electronic components of the PCBA 81 may be mounted on the outer surface 92. For example, the I/F connector 86 may be mounted on the outer surface 92 and protrude from the outer surface 92.

The R/W connector 111 of the circuit 100A and the R/W connector 111 of the circuit 100B are juxtaposed to each other substantially in the Z direction. In other words, the two R/W connectors 111 are aligned substantially in the Z direction. The R/W connector 111 of the circuit 100A is connected to the outer connector 46 of the connector 42A. The R/W connector 111 of the circuit 100B is connected to the outer connector 46 of the connector 42B. In this manner, the PCB 85 and the FPC 18A and 18B are electrically connected to each other through the connectors 42A and 42B.

The SoC 112 of the circuit 100A controls the magnetic head 62 of the HSA 15A through the R/W connector 111, the connector 42A, the FPC 18A, and the flexure 67. The SoC 112 of the circuit 100B controls the magnetic head 62 of the HSA 15B through the R/W connector 111, the connector 42B, the FPC 18B, and the flexure 67. Further, the SoC 112 of the circuit 100A or the circuit 100B controls the SPM 14 through the FPC 83. Another electronic component may control the SPM 14.

In each of the circuits 100A and 100B, the R/W connector 111, the SoC 112, the DRAM 113, the SVC 114, and the FROM 115 are arranged in the X direction. The R/W connector 111 has a rectangular parallelepiped shape extending in the Z direction. That is, the terminals of the R/W connectors 111 are arranged in the Z direction. Thus, in each of the circuits 100A and 100B, the wiring connecting the terminal of the R/W connector 111 and other components can be arranged in a substantially linear form in the X direction.

The RV sensors 101 are, for example, shock sensors or acceleration sensors. The two RV sensors 101 are separated from each other. For example, one RV sensor 101 is mounted on an end of the PCB 85 in the +X direction. The other RV sensor 101 is mounted on an end of the PCB 85 in the −X direction. The positions of the RV sensors 101 are not limited to this example.

Figure 5:
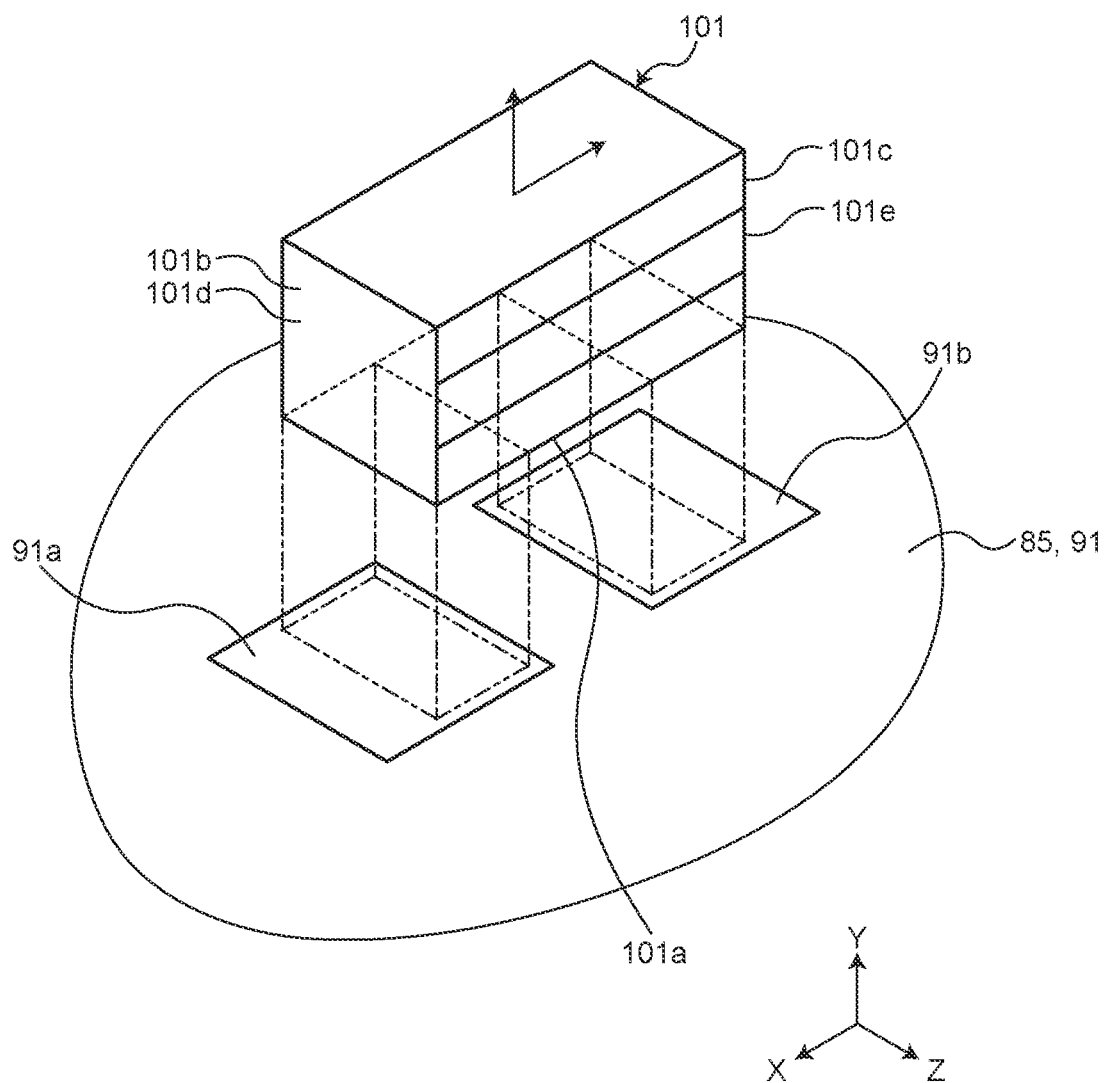
FIG. 5 is an exemplary perspective view illustrating a PCB and a RV sensor of the first embodiment in an exploded manner.

FIG. 5 is an exemplary perspective view illustrating the PCB 85 and the RV sensor 101 of the first embodiment in an exploded manner. As illustrated in FIG. 5, the RV sensor 101 has a substantially rectangular parallelepiped shape, and includes a bottom surface 101a, two end surfaces 101b and 101c, and two electrodes 101d and 101e.

The bottom surface 101a is substantially flat and faces in the −Y direction. The bottom surface 101a of the RV sensor 101 and the inner surface 91 of the PCB 85 face each other. The end surface 101b is located, for example, at an end of the RV sensor 101 in the +X direction. The end surface 101b is substantially flat and faces in the +X direction. The end surface 101c is located, for example, at an end of the RV sensor 101 in the −X direction. The end surface 101c is substantially flat and faces in the −X direction.

The electrode 101d extends along a part of the bottom surface 101a and the end surface 101b. The electrode 101e extends along a part of the bottom surface 101a and the end surface 101c. The positions of the electrodes 101d and 101e are not limited to this example. The two electrodes 101d and 101e are separated from each other.

The PCB 85 includes two pads 91a and 91b on the inner surface 91. The pad 91a is bonded to the electrode 101d via, for example, solder. The pad 91b is bonded to the electrode 101e via, for example, solder. In this manner, the electrodes 101d and 101e are electrically connected to the PCB 85.

The two RV sensors 101 of the present embodiment is capable of detecting acceleration in the X direction and the Y direction. Thus, the two RV sensors 101 can detect X-directional acceleration, Y-directional acceleration, and angular acceleration around the Z axis of the HDD 10. The X direction is along the bottom surface 101a and is an example of a first direction. The Y direction is substantially orthogonal to the bottom surface 101a and is an example of a second direction.

In the HDD 10 according to the first embodiment described above, the housing 11 includes the bottom wall 25 having the SPM 14 attached thereto, and the side wall 26 protruding from the bottom wall 25 to surround the inner chamber S. Thus, the magnetic disks 13 held by the SPM 14 are situated along the bottom wall 25. The magnetic disks 13 and the HSA 15A and 15B for reading and writing information from and to the magnetic disks 13 are arranged along the bottom wall 25. The PCB 85 is attached to the outer surface 36 of the side wall 26 facing the outside of the inner chamber S. The I/F connector 86 is attached to the PCB 85 and configured to be connected to an external device. That is, the PCB 85 with the I/F connector 86 attached can be used as a main circuit board of the HDD 10. Each of the magnetic disks 13 has a diameter of 80 mm or more and 100 mm or less. Namely, the HDD 10 corresponds to a 3.5-inch HDD. The housing 11 has a maximum axial dimension of 26.2 mm or more. Specifically, the axial dimension of the housing 11 is set to larger than one of the specified dimensions by SFF-8300, i.e., 26.10 mm. This allows the PCB 85 on which the I/F connector 86 is mounted to be elongated in the axial direction. In view of preventing interference with the components accommodated in the inner chamber S such as the magnetic disks 13 and the HSA 15A and 15B, the size of the PCB 85 attached to the outer surface 32 of the bottom wall 25 may be subject to constraints. However, the PCB 85 of the present embodiment is attached to the outer surface 36 of the side wall 26, therefore, the PCB 85 is less likely to interfere with the components accommodated in the inner chamber S irrespective of its enlarged size along the side wall 26. This makes it possible to form the PCB 85 in a desired size while preventing interference with the components accommodated in the inner chamber S. Consequently, the HDD 10 of the present embodiment can improve the flexibility in design.

In a conventional HDD, the PCB is attached to the bottom wall of the housing. In this case, the size of the PCB is subject to constraints due to the magnetic disks and the HSAs, as described above. The size of the PCB may be subject to additional constraints in view of preventing leakage of the helium from the housing. In addition, as the number of the magnetic disks increases, the power consumption of the spindle motor and the VCM increases. The increase in the power consumption leads to increasing the numbers of MLCCs and tantalum capacitors. It is however difficult to add MLCCs and/or tantalum capacitors on the PCB if there is a limitation on the area of the PCB and the size of the space around the PCB. It is also difficult to add a control circuit to the HDD including a multi-actuator. The HDD 10 according to the present embodiment can solve the conventional disadvantages as described above, and can improve the flexibility in design.

The I/F connector 86 conforms to at least one of the SATA standard and the SAS standard. The I/F connector 86 is positioned in line with a connector mounted on a 3.5-inch device as defined by one specification of SFF-8300. As a result, the HDD 10 of the present embodiment can be mounted on various kinds of devices in place of a typical 3.5-inch HDD conforming to SFF-8300.

The maximum axial dimension of the housing 11 is set to more than 42 mm and 54 mm or less. Thus, the outer surface 36 of the side wall 26 is elongated in the axial direction, which allows implementation of the PCB 85 of a longer axial length. This accordingly makes it possible to mount a larger number of or a larger-size electronic components on the PCB 85 with a margin. Thus, the HDD 10 of the present embodiment can improve the flexibility in design.

The number of the magnetic disks 13 mounted on the HDD 10 is 20 or more. The axial length of the outer surface 36 of the side wall 26 is increased in accordance with the axial arrangement of 20 or more magnetic disks 13. Thus, the PCB 85 of a longer axial length can be implemented, so that a larger number of or a larger-size electronic components can be mounted thereon. Consequently, the HDD 10 of the present embodiment can improve the flexibility in design.

The I/F connector 86 is a right angle connector, therefore, the I/F connector 86 is connectable to an external device in the Y direction as in a typical HDD.

The SoC 112 is mounted on the PCB 85 and configured to control the SPM 14. Namely, the PCB 85 is a main circuit board on which the SoC 112 and the I/F connector 86 are mounted. Attaching the main PCB 85 to the side wall 26 eliminates the necessity to mount an additional circuit board on another part of the housing 11, such as the bottom wall 25.

The I/F connector 86 is located between the side wall 26 and the PCB 85. In other words, the I/F connector 86 does not protrude from the PCB 85 to the outside. Because of this, the HDD 10 of the present embodiment can be mounted on various kinds of devices in place of a typical HDD.

The outer surface 36 of the side wall 26 is provided with the recess 38 to accommodate the I/F connector 86. Such a structure makes it easier to place the I/F connector 86 in-between the side wall 26 and the PCB 85 in the HDD 10 according to the present embodiment, allowing efficient use of the inner chamber S in the housing 11.

The actuators AcA and AcB move the magnetic head 62 by rotating about the same axis Ax2. In other words, the HDD 10 of the present embodiment includes a multi-actuator. By including the multi-actuator, an increased number of electronic components is to be mounted on the circuit board in the HDD 10 as compared with a typical HDD. The HDD 10 according to the present embodiment can, however, allow placement of the PCB 85 of a desired size, so that the design of the HDD 10 can be less subject to constraints due to the multi-actuator.

The FPC 18A and 18B are accommodated in the inner chamber S. The connectors 42A and 42B electrically connect the PCB 85 and the FPC 18A and 18B through the through hole 37 in the side wall 26. The actuators AcA and AcB are aligned in the axial direction. The connectors 42A and 42B are side by side in the axial direction. Such arrangement makes it unnecessary to connect the FPC 18A to the connector 42B via the FPC 18B or crossing the FPC 18B. Thus, the FPC 18A and 18B can have the same simplified structure.

The FPC 18A and 18B are accommodated in the inner chamber S. The connectors 42A and 42B electrically connect the PCB 85 and the FPC 18A and 18B through the through hole 37 in the side wall 26. In a typical HDD, the connectors penetrate the bottom wall 25, causing the FPC 18A and 18B to be bent along the bottom wall 25. However, in the present embodiment, it is not necessary to bend the FPC 18A and 18B along the bottom wall 25. In other words, the FPC 18A and 18B include no portions to be bend. This results in downsizing of the FPC 18A and 18B and omission of components such as a reinforcing plate for holding the FPC 18A and 18B along the bottom wall 25. Thus, the HDD 10 of the present embodiment can implement cost reduction. In addition, the HDD 10 can provide a larger space to dispose other components in the inner chamber S.

The RV sensor 101 includes the bottom surface 101*a* facing the PCB 85, and the electrodes 101*d* and 101*e* mounted on the bottom surface 101*a* and electrically connected to the PCB 85. Typically, the shock sensor works to detect acceleration in two directions along the bottom surface 101*a*. However, the RV sensor 101 of the present embodiment is capable of detecting acceleration in the X direction along the bottom surface 101*a* and the Y direction orthogonal to the bottom surface 101*a*. Such an RV sensor 101 can detect the acceleration in the same manner as a typical shock sensor mounted on the PCB attached to the outer surface 32 of the bottom wall 25.

The PCB 82 is attached to the outer surface 32 of the bottom wall 25 facing the outside of the inner chamber S. This allows a larger number of or larger-size electronic components to be mounted on the PCB 85 and the PCB 82 in a distributed manner. Thus, the HDD 10 of the present embodiment can improve the flexibility in design.

Second Embodiment

Hereinafter, a second embodiment will be described with reference to FIG. 6. In the following description of the plurality of embodiments, components having the same functions as those of the components already described are denoted by the same reference numerals as those of the components already described, and the description thereof may be omitted. The plurality of components denoted by the same reference numerals do not necessarily have all the functions and properties in common, and may have different functions and properties according to each embodiment.

Figure 6:
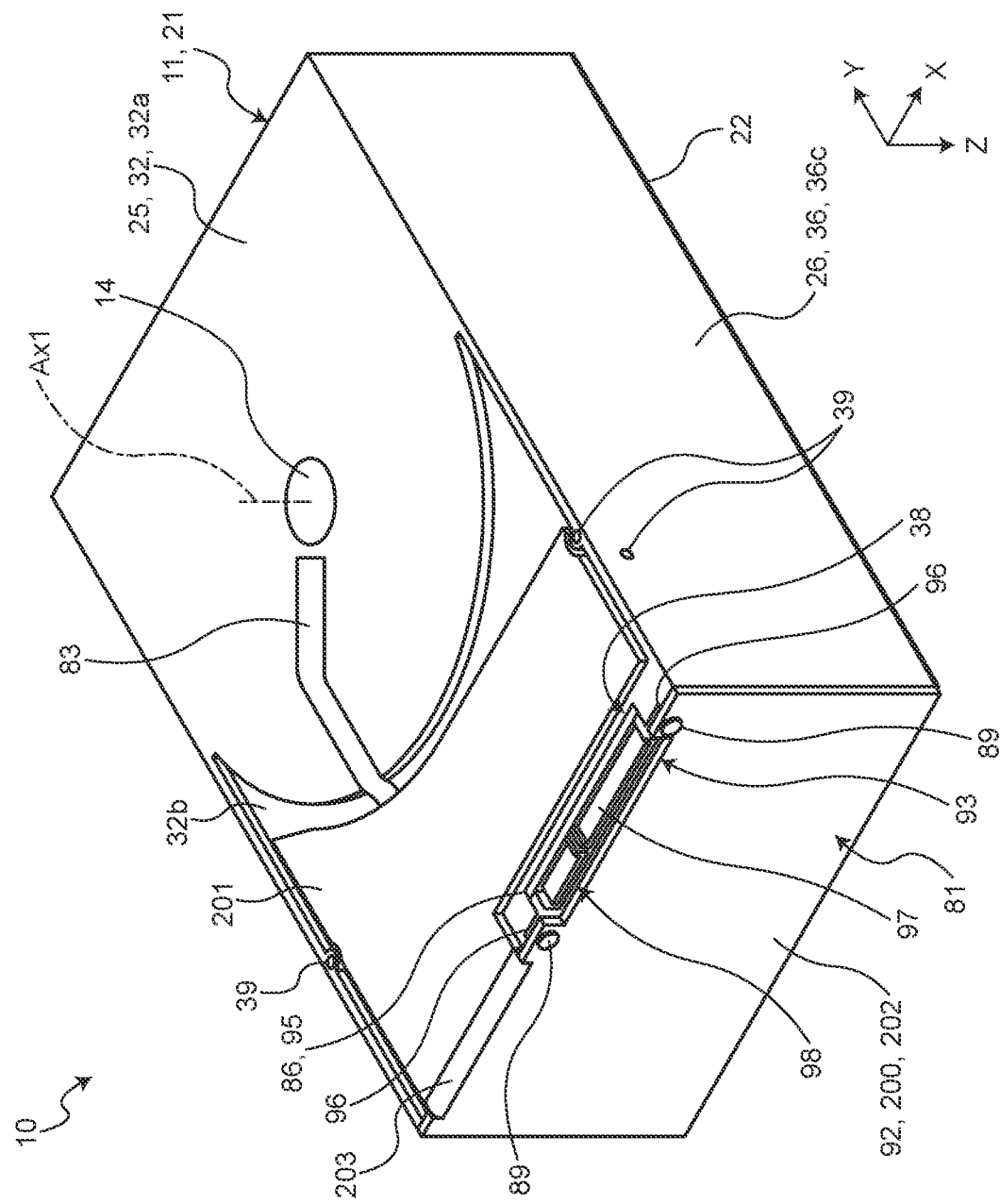
FIG. 6 is an exemplary perspective view illustrating an HDD according to a second embodiment.

FIG. 6 is an exemplary perspective view illustrating the HDD 10 according to the second embodiment. As illustrated in FIG. 6, the HDD 10 of the second embodiment includes a composite board 200 instead of the PCB 82 and the PCB 85. The composite board 200 is an example of the first board. The composite board 200 is substantially equal to PCB 85 except for the points described below.

The composite board 200 is a flex-rigid wiring board or a rigid flexible circuit board. The composite board 200 includes two rigid parts 201 and 202 and a flexible part 203. The rigid part 201 is an example of a first part. The rigid part 202 is an example of a second part. The flexible part 203 is an example of a third part.

The flexible part 203 is formed of an FPC. Thus, the flexible part 203 has flexibility. The rigid parts 201 and 202 are formed of the FPC forming the flexible part 203 and a PCB joined to the FPC. The rigid parts 201 and 202 and the flexible part 203 are not limited to this example.

The rigid parts 201 and 202 are higher in rigidity than the flexible part 203. The two rigid parts 201 and 202 are separated from each other. The flexible part 203 is located between the rigid part 201 and the rigid part 202 to electrically connect the two rigid parts 201 and 202.

The rigid part 201 is attached to the outer surface 32 of the bottom wall 25 in the same manner as the PCB 82 of the first embodiment. The rigid part 202 is attached to the outer surface 36 of the side wall 26 in the same manner as the PCB 85 of the first embodiment.

The I/F connector 86, the RV sensor 101, the electronic fuse 102, the R/W connector 111, the SoC 112, the DRAM 113, the SVC 114, the FROM 115, and the regulator 116 are mounted on the rigid part 202. At least one of the RV sensor 101, the electronic fuse 102, the R/W connector 111, the SoC 112, the DRAM 113, the SVC 114, the FROM 115, and the regulator 116 may be mounted on the rigid part 201.

In the HDD 10 of the second embodiment described above, the composite board 200 includes the rigid parts 201 and 202 and the flexible part 203. The rigid part 201 is attached to the outer surface 32 of the bottom wall 25 facing the outside of the inner chamber S. The rigid part 202 is attached to the outer surface 36 of the side wall 26. The flexible part 203 is located between the rigid part 201 and the rigid part 202. Such arrangement allows a larger number of or larger-size electronic components to be mounted on the rigid parts 201 and 202 in a distributed manner. Thus, the HDD 10 of the present embodiment can improve the flexibility in design.

Third Embodiment

Figure 7:
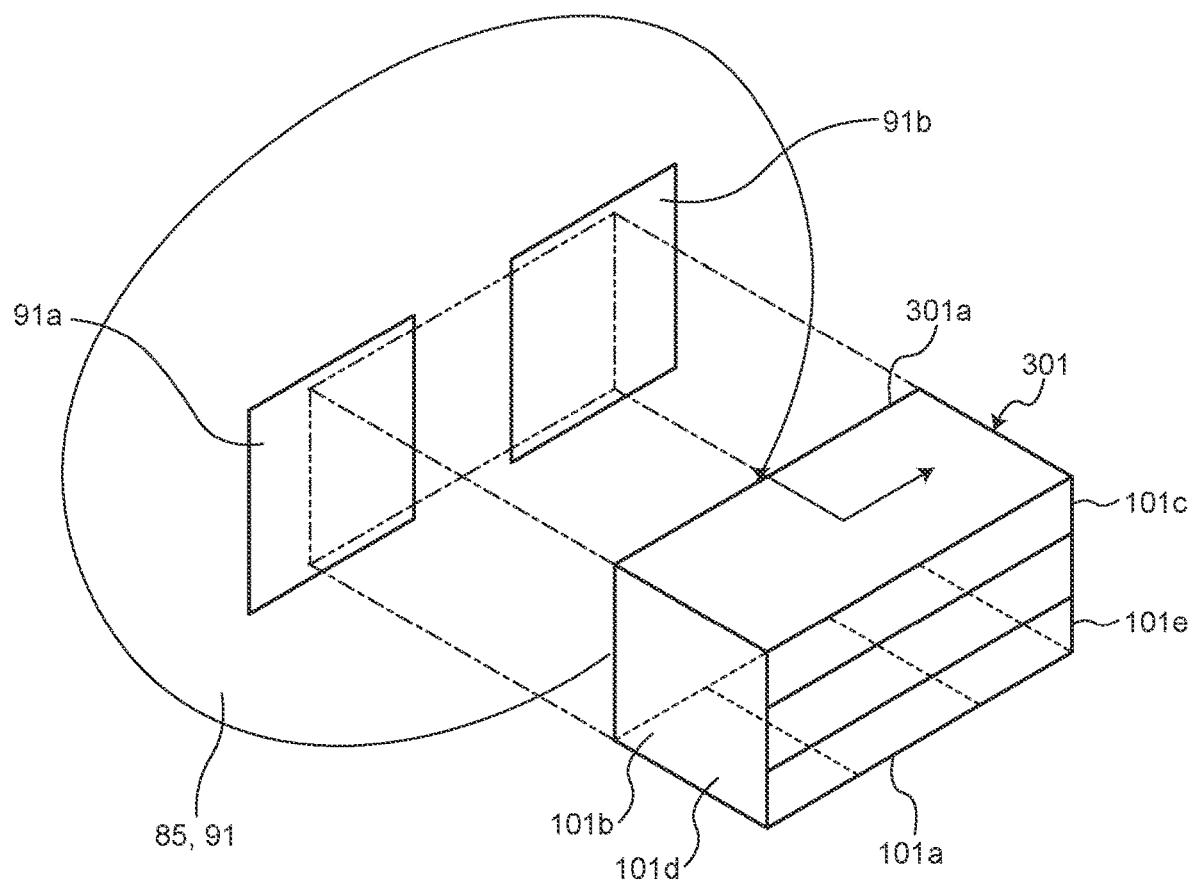
FIG. 7 is an exemplary perspective view illustrating a PCB and a RV sensor according to a third embodiment in an exploded manner.

Hereinafter, a third embodiment will be described with reference to FIG. 7. FIG. 7 is an exemplary perspective view illustrating the PCB 85 and a RV sensor 301 according to the third embodiment in an exploded manner. As illustrated in FIG. 7, the PCBA 81 of the third embodiment includes the RV sensor 301 instead of the RV sensor 101. The RV sensor 301 is substantially identical to the RV sensor 101 except for the points described below.

The bottom surface 101a of the RV sensor 301 is situated, for example, along the X-Y plane and faces substantially in the +Z direction. The RV sensor 301 further includes a side surface 301a. The side surface 301a intersects the bottom surface 101a. The side surface 301a is substantially flat and faces in the −Y direction. The side surface 301a of the RV sensor 301 and the inner surface 91 of the PCB 85 face each other.

The electrodes 101d and 101e are provided not on the side surface 301a but on the bottom surface 101a and the end surfaces 101b and 101c. That is, the electrodes 101d and 101e are spaced from the side surface 301a.

The pad 91a is bonded to the electrode 101d of the end surface 101b via, for example, solder. The pad 91b is bonded to the electrode 101e of the end surface 101c via, for example, solder. In this manner, the electrodes 101d and 101e can be electrically connected to the PCB 85 even when the bottom surface 101a and the inner surface 91 of the PCB 85 are not facing each other.

The RV sensor 301 of the present embodiment is capable of detecting acceleration in the X direction and the Y direction. The X direction and the Y direction are along the bottom surface 101a and are examples of two directions along the bottom surface.

In the HDD 10 of the third embodiment described above, the RV sensor 301 includes the bottom surface 101a, the side surface 301a, and the electrodes 101d and 101e. The side surface 301a intersects the bottom surface 101a. The electrodes 101d and 101e are mounted on the bottom surface 101a away from the side surface 301a, and are electrically connected to the PCB 85. The RV sensor 301 can detect acceleration in two directions along the bottom surface 101a. The bottom surface 101a provided with the electrodes 101d and 101e typically faces the circuit board (PCB 85) on which the RV sensor 301 is mounted. In the present embodiment, however, the side surface 301a of the RV sensor 301 faces the PCB 85. As a result, the RV sensor 301 can detect acceleration in the same manner as a typical shock sensor mounted on the PCB 85 attached to the outer surface 32 of the bottom wall 25.

In the above embodiment, the I/F connector 86 is a right angle connector. Alternatively, the I/F connector 86 may be a normal connector with the connection terminal 97 extending in a direction along the inner surface 91 on which the I/F connector 86 is mounted.

In the above embodiment, the PCB 82 and the rigid part 201 are attached to the outer surface 32 of the bottom wall 25. Alternatively, the PCB 82 and the rigid part 201 may be attached to another part of the housing 11 such as the side surface 36c of the side wall 26.

In the above description, "limit" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
    a plurality of magnetic disks arranged in an axial direction along a first rotation axis;
    a spindle motor configured to rotate the plurality of magnetic disks about the first rotation axis;
    a housing with an inner space in which the plurality of magnetic disks and the spindle motor are accommodated,
    the housing including:
        a first wall having the spindle motor attached thereto, and
        a second wall protruding from the first wall to surround the inner space;
        a first board attached to an outer surface of the second wall, the outer surface facing an outside of the inner space; and
        a first connector attached to the first board and configured to be connected to an external device,
    wherein
    each of the plurality of magnetic disks has a diameter of 80 mm or more and 100 mm or less, and
    the housing has a maximum dimension of 26.2 mm or more in the axial direction.

2. The disk device according to claim 1, wherein
    the first connector is a connector conforming to at least one of Serial ATA standard and Serial Attached SCSI standard, and
    the first connector is positioned in line with a connector mounted on a 3.5-inch device as defined by one specification of SFF-8300.

3. The disk device according to claim 1, wherein
    a number of the plurality of magnetic disks is 20 or more.

4. The disk device according to claim 1, wherein
    the first connector is a right angle connector.

5. The disk device according to claim 1, further comprising:
    a controller mounted on the first board and configured to control the spindle motor.

6. The disk device according to claim 1, wherein
    the first connector is located between the second wall and the first board.

7. The disk device according to claim 6, wherein
    the outer surface of the second wall is provided with a recess in which the first connector is accommodated.

8. The disk device according to claim 1, further comprising:
    a first magnetic head configured to read and write information from and to a first magnetic disk of the plurality of magnetic disks;

a first actuator holding the first magnetic head and configured to move the first magnetic head by rotating around a second rotation axis;
a second magnetic head configured to read and write information from and to a second magnetic disk of the plurality of magnetic disks; and
a second actuator holding the second magnetic head and configured to move the second magnetic head by rotating around the second rotation axis.

9. The disk device according to claim 8, further comprising:
a first flexible printed circuit board accommodated in the inner space;
a second flexible printed circuit board accommodated in the inner space;
a second connector that electrically connects the first board and the first flexible printed circuit board through a first through hole in the second wall; and
a third connector that electrically connects the first board and the second flexible printed circuit board through a second through hole in the second wall,
wherein
the first actuator and the second actuator are aligned in the axial direction, and
the second connector and the third connector are aligned in the axial direction.

10. The disk device according to claim 1, further comprising:
a flexible printed circuit board accommodated in the inner space; and
a fourth connector that electrically connects the first board and the flexible printed circuit board through a through hole in the second wall.

11. The disk device according to claim 1, further comprising:
a sensor including a bottom surface facing the first board, and an electrode on the bottom surface,
wherein
the electrode is electrically connected to the first board, and
the sensor is capable of detecting acceleration in a first direction along the bottom surface and in a second direction orthogonal to the bottom surface.

12. The disk device according to claim 1, further comprising:
a sensor including a bottom surface, a side surface intersecting the bottom surface and facing the first board, and an electrode being on the bottom surface and being away from the side surface,
wherein
the electrode is electrically connected to the first board, and
the sensor is capable of detecting acceleration in two directions along the bottom surface.

13. The disk device according to claim 1, further comprising:
a second board attached to an outer surface of the first wall, the outer surface facing an outside of the inner space.

14. The disk device according to claim 1, wherein
the first board includes:
a first part attached to an outer surface of the first wall, the outer surface facing an outside of the inner space,
a second part attached to the outer surface of the second wall, and
a third part being flexible and located between the first part and the second part.

* * * * *